United States Patent
Ramasamy et al.

(10) Patent No.: US 12,479,043 B2
(45) Date of Patent: Nov. 25, 2025

(54) ARC IGNITION SYSTEM FOR EXOTHERMIC WELDING APPARATUS

(71) Applicant: Hubbell Incorporated, Shelton, CT (US)

(72) Inventors: Jayaraj Ramasamy, Chennai (IN); K Sundharavadivel, Chennai (IN)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/274,686

(22) PCT Filed: Jan. 24, 2022

(86) PCT No.: PCT/US2022/013492
§ 371 (c)(1),
(2) Date: Jul. 27, 2023

(87) PCT Pub. No.: WO2022/169624
PCT Pub. Date: Aug. 11, 2022

(65) Prior Publication Data
US 2024/0091877 A1   Mar. 21, 2024

Related U.S. Application Data

(60) Provisional application No. 63/144,686, filed on Feb. 2, 2021.

(51) Int. Cl.
*B23K 23/00* (2006.01)
*F23Q 3/00* (2006.01)

(52) U.S. Cl.
CPC ............. *B23K 23/00* (2013.01); *F23Q 3/006* (2013.01)

(58) Field of Classification Search
CPC .. B23K 23/00; B23K 2101/38; B23K 20/165; B23K 37/06
See application file for complete search history.

(56) References Cited

U.S. PATENT DOCUMENTS

| | | | | | |
|---|---|---|---|---|---|
| 3,103,719 | A | * | 9/1963 | Bishop | B23K 23/00 164/520 |
| 4,879,452 | A | * | 11/1989 | Kovarik | B23K 23/00 228/234.3 |

(Continued)

OTHER PUBLICATIONS

International Search Report and Written Opinion in corresponding International Application No. PCT/US22/013492 mailed on Apr. 11, 2022. (9 pages).

(Continued)

*Primary Examiner* — Erin B Saad
(74) *Attorney, Agent, or Firm* — Wissing Miller LLP

(57) ABSTRACT

The ignition system holds a quantity of a reaction mixture in a hopper. The hopper is closed at the bottom by a movable gate. When the gate is opened, powder falls from the hopper, though a passage, and through an ignition chamber. High voltage electrodes are provided in the ignition chamber. As the powder falls through the ignition chamber, the electrodes are energized, generating an electrical arc. The arc ignites the falling powder. The ignited powder falls from the bottom of the chamber and into the reaction chamber of an exothermic mold, where the ignited powder initiates a thermite reaction that generates molten metal to form an exothermic weld.

11 Claims, 10 Drawing Sheets

(56) References Cited

U.S. PATENT DOCUMENTS

| | | | | |
|---|---|---|---|---|
| 4,885,452 A * | 12/1989 | Amos | ................... | B23K 23/00 228/234.3 |
| 4,889,324 A * | 12/1989 | Brosnan | ................ | B23K 23/00 266/144 |
| 5,145,106 A * | 9/1992 | Moore | .................. | B23K 23/00 228/234.3 |
| 5,515,904 A * | 5/1996 | Radulescu | ............. | E01B 11/52 164/133 |
| 5,528,012 A | 6/1996 | Schlienger | | |
| 5,647,425 A * | 7/1997 | Foutz | .................... | B23K 23/00 249/105 |
| 5,653,279 A * | 8/1997 | Foutz | .................... | B23K 23/00 228/234.3 |
| 5,954,261 A * | 9/1999 | Gaman | ................. | B23K 23/00 249/97 |
| 6,317,971 B1 * | 11/2001 | Colarusso | ............. | H01R 4/625 29/825 |
| 6,776,386 B1 * | 8/2004 | Morrissey | ............. | B23K 23/00 228/234.3 |
| 7,721,937 B2 * | 5/2010 | Siracki | ................ | B23K 35/0244 228/234.3 |
| 7,975,900 B2 | 7/2011 | Lofton et al. | | |
| 9,273,867 B2 * | 3/2016 | Buzinski | ................ | F23Q 3/006 |
| 9,764,419 B2 | 9/2017 | Pomar Garcia et al. | | |
| 10,239,162 B2 * | 3/2019 | Hoagland | .............. | B23D 19/04 |
| 11,852,342 B2 * | 12/2023 | Wu | .......................... | F23Q 3/002 |
| 11,933,493 B2 * | 3/2024 | Wu | .......................... | F23Q 2/28 |
| 2002/0104953 A1 * | 8/2002 | Triantopoulos | ........ | B23K 23/00 249/86 |
| 2003/0006272 A1 * | 1/2003 | Cordier | ................. | B23K 23/00 228/234.3 |
| 2003/0178168 A1 * | 9/2003 | Triantopoulos | ........ | B23K 23/00 249/86 |
| 2004/0222274 A1 * | 11/2004 | Harger | .................. | B23K 23/00 228/234.3 |
| 2007/0017955 A1 * | 1/2007 | Siracki | ................. | B23K 35/025 228/2.5 |
| 2007/0107869 A1 * | 5/2007 | Lofton | ................... | B23K 23/00 228/234.3 |
| 2007/0272114 A1 * | 11/2007 | Delcroix | ................... | B22C 9/22 104/2 |
| 2009/0173873 A1 * | 7/2009 | Stidham | ................. | B23K 23/00 228/56.3 |
| 2009/0188969 A1 * | 7/2009 | Siracki | ............... | B23K 35/3602 228/198 |
| 2011/0132966 A1 * | 6/2011 | Lofton | ................... | B23K 23/00 228/33 |
| 2011/0217662 A1 * | 9/2011 | Zagoroff | ................. | F23Q 3/002 431/264 |
| 2011/0240244 A1 * | 10/2011 | Sepelak | ................. | B23K 23/00 249/106 |
| 2012/0255699 A1 * | 10/2012 | Sepelak | ................. | B23K 23/00 164/271 |
| 2014/0048037 A1 | 2/2014 | McAlister | | |
| 2014/0220499 A1 * | 8/2014 | Buzinski | ................. | F23Q 3/006 431/6 |
| 2015/0041520 A1 * | 2/2015 | Pomar Garcia | ........... | F42B 3/10 228/33 |
| 2017/0232551 A1 | 8/2017 | Abedraboh | | |
| 2018/0245292 A1 * | 8/2018 | Koski | ...................... | E01B 31/13 |
| 2019/0001431 A1 * | 1/2019 | Stilwell | .................. | B23K 37/04 |
| 2024/0139860 A1 * | 5/2024 | Gm | ........................ | B23K 23/00 |

OTHER PUBLICATIONS

International Preliminary Report on Patentability in corresponding International Application No. PCT/US22/013492 mailed on Aug. 17, 2023. (7 pages).

Frontiers in Chemistry; Combustion Characteristics of Physically Mixed 40 nm Aluminum/Copper Oxide Nanothermites Using Laser Ignition; Florin Saceleanu et al., Oct. 9, 2018. (10 pages).

https://www.harger.com/roduct-category/exothermic-welding, Wayback Machine capture Oct. 24, 2020.

* cited by examiner

ARC IGNITION SYSTEM FOR EXOTHERMIC WELDING APPARATUS

This application is a 371 of PCT/US2022/013492, filed on Jan. 24, 2022, published on Aug. 11, 2022, under publication number WO 2022/169624, which claims priority benefits from U.S. Provisional Patent Application No. 63/144,686, filed on Feb. 2, 2021, the disclosure of which is incorporated herein by reference.

BACKGROUND

Field

The present disclosure relates to ignition systems for initiating reactions to form exothermic welds. In particular, the present disclosure relates to an ignition system that ignites a small quantity of an ignition powder or a welding powder using an electrical arc and delivers the ignited powder to the reaction chamber of an exothermic mold.

Description of the Related Art

Exothermic molding is a technique for joining metal objects, such as electrical conductors, using a highly exothermic chemical reaction. Welds created using this technique are mechanically strong and provide a secure, low resistance electrical connection between the objects. Such welds may be useful for lightning arrestors, grounding connections for electrical utility equipment, and the like.

Exothermic welding uses a powdered reaction mixture of metals and metal oxides held in the reaction chamber of a mold. When the mixture is ignited it produces a molten metal. The molten metal flows from the reaction chamber into a mold cavity. Objects to be welded are positioned in the mold cavity. The molten metal wets the objects and fills the mold cavity. When the metal cools and solidifies the mold is removed, leaving the finished welded joint.

Exothermic welding relies on a thermite chemical reaction, for example, between copper oxide (i.e., copper (II) oxide, CuO) and powdered aluminum, that produces molten copper. Such reactions can reach temperatures in excess of 4000° F. In addition, copper (II) thermite reactions can be so fast that copper thermite can be considered a type of flash powder. When the mixture is ignited an explosion can occur and send a spray of copper drops to a considerable distance. Given these high temperatures and the risk that the mixture may spray hot materials, safety is a primary concern when creating an exothermic weld.

Known systems for igniting the reaction mixture in an exothermic mold include using a direct spark igniter, sometimes called a "spark gun." A small quantity of ignition powder is placed at the top of the mold above the reaction chamber. The user creates a spark by squeezing the handles of the spark gun, generating high-temperature sparks. This method requires the user to be in close proximity to the mold when the reaction is initiated. This may increase the user's risk of injury. In addition, spark gun igniters may not reliably ignite the reaction mixture.

Another known method for igniting the reaction mixture in an exothermic mold is to use an electrical igniter. An igniter wire is inserted into the reaction mixture. The igniter wire is connected to a power source by a relatively long cable. This allows the user operating the power source to stay at a distance from the mold when the reaction mixture is ignited. This may reduce the risk of injury. Alternatively, instead of using long wires between the power source and the ignitor, the power source includes a delay timer that allows the user to set up the igniter, start the timer, and move to a safe distance from the mold before the reaction is initiated.

Many reaction mixtures for exothermic welding, such as copper thermite, require a high temperature to initiate the exothermic reaction. For some mixtures, this temperature is greater than 3000° F. To reach these temperatures, the igniter wire of an electrical ignition system needs to be made from materials that reach a high temperature when initially heated by the flow of electrical current. Such materials may include rare metals, such as palladium. The igniter wire itself is destroyed when the reaction mixture ignites, meaning that a new igniter wire is required each time a weld is made. Rare metals like palladium are expensive, increasing the cost to make an exothermic weld.

To reliably ignite an exothermic mixture using known electrical ignition systems, significant current must be delivered to the palladium igniter to assure that it reaches a high enough temperature to initiate the reaction. When insufficient current is provided, the igniter may fail to start the reaction. Power supplies that can deliver sufficient current to reliably ignite the reaction mixture may be heavy, bulky, and expensive. The bulk and weight of such systems may make them less convenient to use where exothermic welds are made in remote locations, for example, in connection with long distance electrical transmission lines. Providing sufficient current is made more difficult by resistive loss through long wires between the power source operated by the user and the mold.

SUMMARY

The present disclosure provides exemplary embodiments of an ignition system for exothermic welding that addresses the problems of prior art systems. According to one aspect, there is provided an ignition system that allows a user to be positioned at a safe distance from the exothermic mold when a reaction is initiated. According to another aspect there is provided a system that reliable ignites the exothermic reaction mixture. According to another aspect, there is provided an ignition system that is relatively small, light-weight, and easy to carry. According to a further aspect, there is provided an ignition system that reliably and repeatedly ignites reactions to perform multiple exothermic welds before being recharged.

According to one embodiment, there is provided an igniter apparatus comprising a powder container, the container adapted to hold an ignition powder, an ignition chamber positioned below the powder container, a gate connecting the powder container and the ignition chamber, the gate adapted to open to allow powder to fall from the powder container into the ignition chamber, and an arc electrode proximate to the ignition chamber, wherein, when a high voltage is applied to the electrode an electrical arc is generated within the ignition chamber and wherein the arc ignites the powder. The apparatus may further comprise a controller, a solenoid connected with the gate controlled by the controller to open and close the gate, and a high voltage generator connected with the electrode and controlled by the controller, wherein the controller actuates the solenoid to open the gate in timed relation to application of the high voltage to the electrode from the generator, and wherein the arc is generated as powder falls into the chamber. The ignition chamber may comprise a bottom opening and wherein powder ignited by the arc within the chamber falls through the chamber and out the bottom opening. The apparatus may further comprise a sloped passage between the gate and the ignition chamber, wherein powder falling from the container flows along the sloped passage and into the ignition chamber. The ignition chamber may comprise one or more of a ceramic, a glass, a stone, and a metal. The ceramic of the ignition chamber may comprise calcium sulphate and magnesium oxide. The electrode may comprise a conductor and a graphite tip in electrical connection with the conductor and wherein the graphite tip faces the ignition chamber. The apparatus may further comprise a cleaning rod, wherein the cleaning rod is movable between an inserted configuration extending through the ignition chamber and a retracted configuration withdrawn from the ignition chamber, and wherein, when the cleaning rod is in the inserted configuration, the rod engages the gate to hold the gate closed to the passage of powder. The apparatus may further comprise a tilt sensor. The high voltage generator may comprise an induction coil, wherein the coil comprises a primary winding and a plurality of secondary winding segments. The apparatus may further comprise a radiofrequency receiver connected with the controller, wherein the controller operates the gate and generator in response to a signal received by the receiver.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
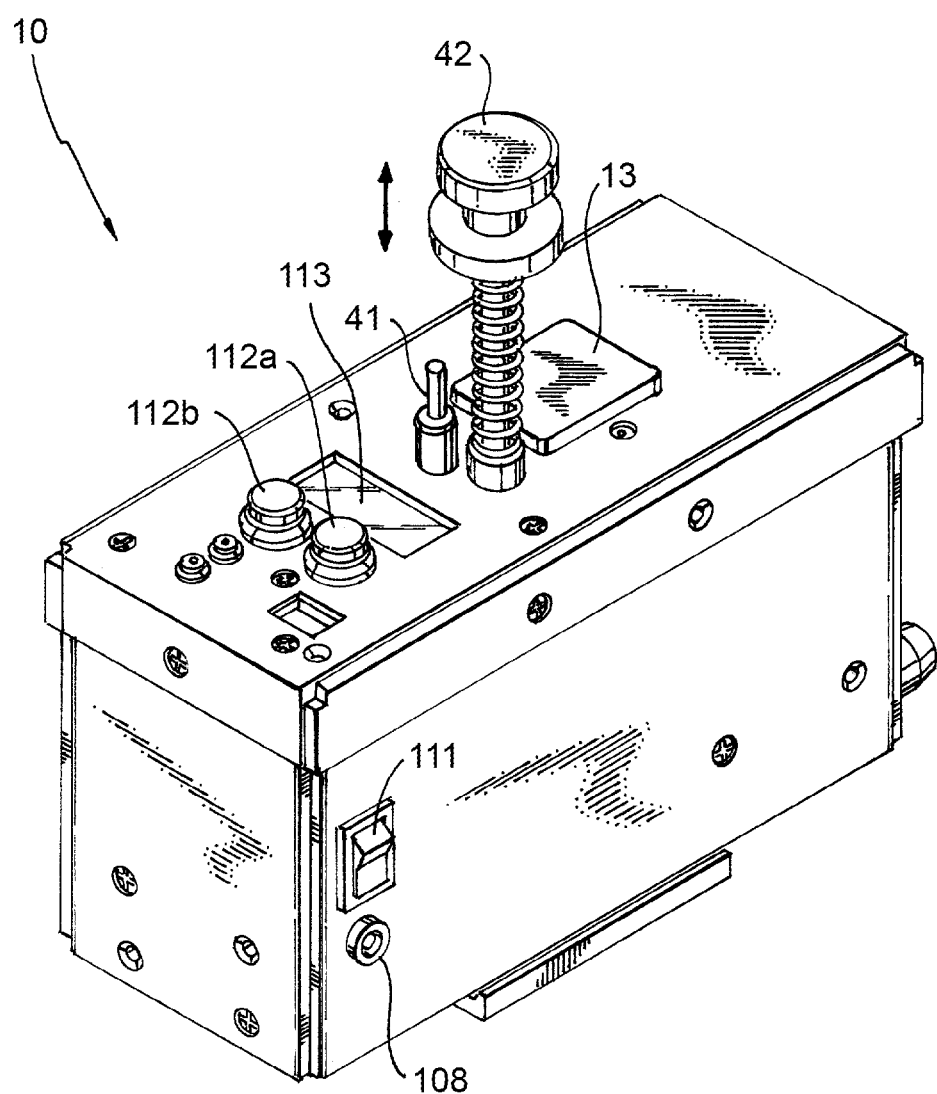
FIG. 1 is a perspective view of an arc ignition system according to an embodiment of the present disclosure.
Figure 2A:
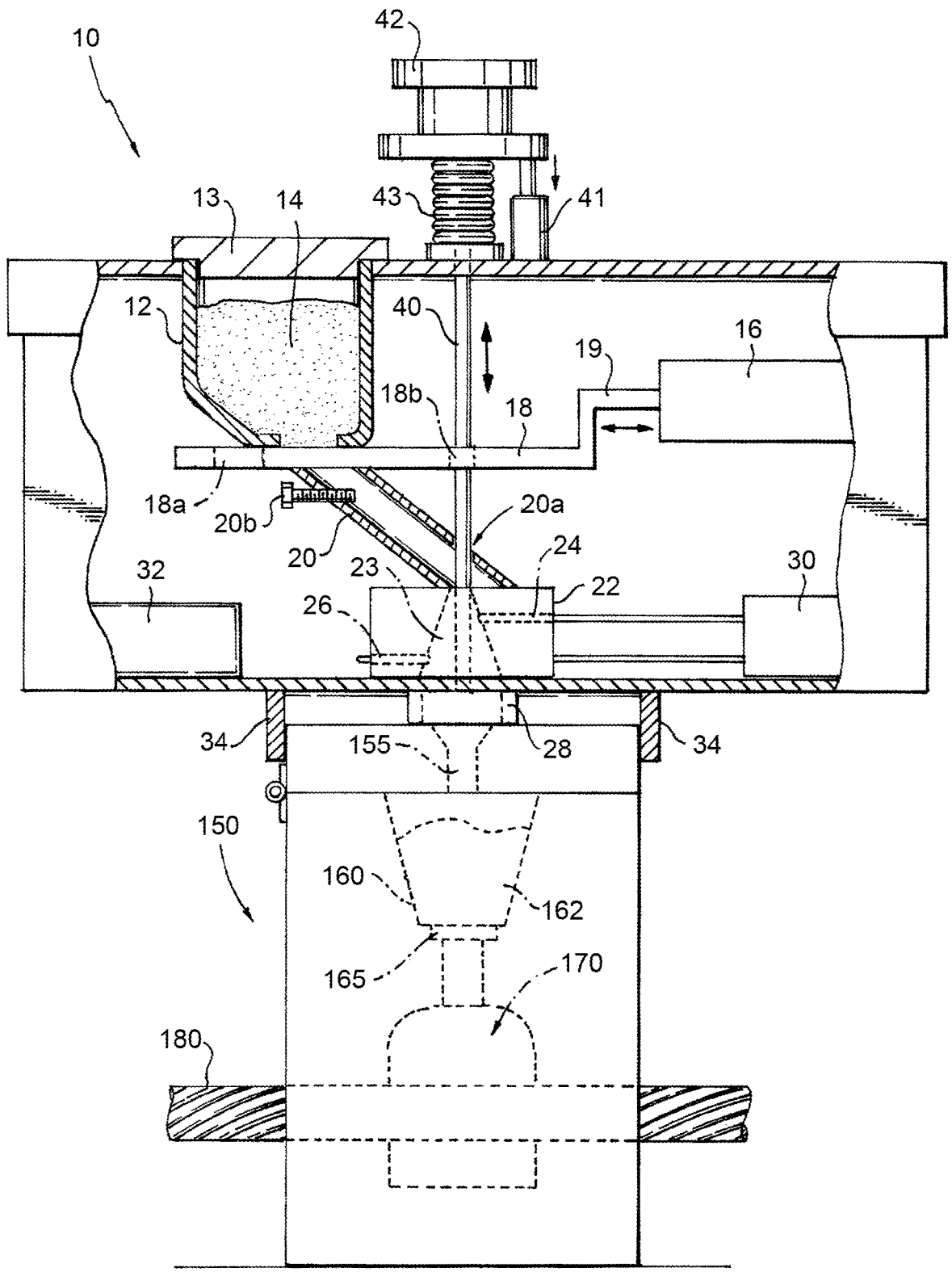
FIGS. 2a and 2b are cross-section views of the ignition system of FIG. 1 with FIG. 2a showing the system prior to being enabled to initiate an exothermic reaction and FIG. 2b showing the system activated to initiate the reaction.
Figure 2B:
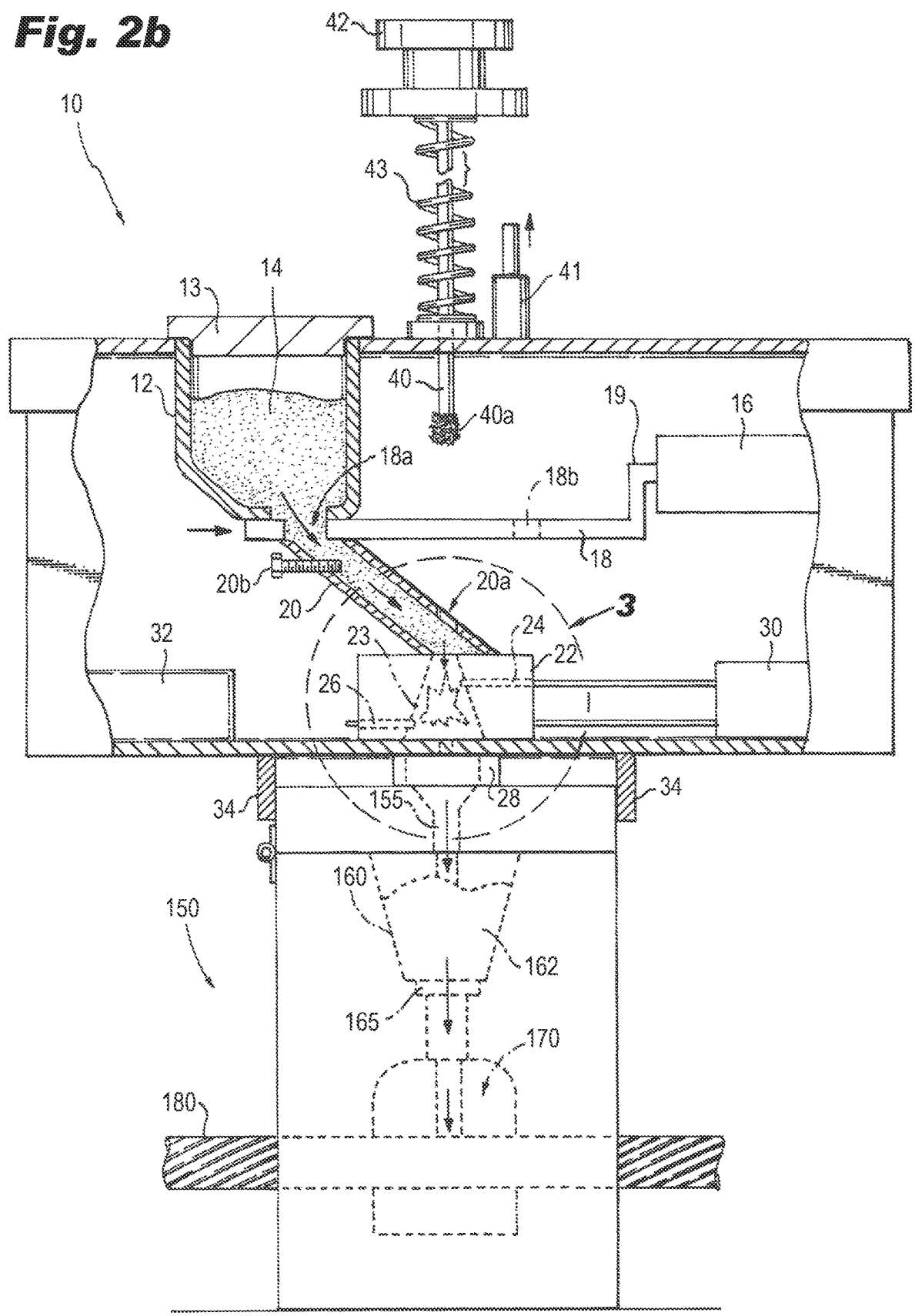

FIG. 1 shows a perspective view of an electrical arc ignition system 10 for an exothermic mold according to an embodiment of the disclosure. FIGS. 2a and 2b show cross-section views of ignition system 10 positioned to initiate a reaction in an exothermic mold 150. Main power switch 111 is positioned on the side of the system 10. Ignition switch 112a, timer switch 112b, and display 113 are positioned on the top of the ignition system 10. FIG. 2a shows the system prior to initiating a reaction. In FIG. 2b, the system has been activated.

Within the ignition system 10 is a powder hopper 12. Hopper 12 contains a quantity of a powdered reaction mixture 14. Cover 13 fits over hopper 12 to securely hold the reaction mixture 14 in the hopper 12. According to one embodiment, hopper 12 holds sufficient reaction mixture for performing multiple exothermic welds. According to some embodiments, up to 50 exothermic welds can be ignited with the quantity of powder 14 held in hopper 12.

Reaction mixture 14 may be a copper thermite (CuO+ powdered Al) or may be another material that reacts at a sufficiently high temperature to initiate an exothermic weld, as will be described below. According to one embodiment, powder 14 is the same reaction mixture used to form the exothermic weld.

Gate 18 is provided at an outlet at the bottom of hopper 12. Gate 18 is moveable horizontally. In the unactuated condition shown in FIG. 2a, gate 18 closes the bottom opening of hopper 12, keeping the reaction mixture 14 in the hopper. Gate 18 is connected with solenoid 16 by arm 19. When solenoid 16 is energized, as shown in FIG. 2b, gate 18 is moved horizontally, so that a hole 18a in the gate aligns with the opening at the bottom of hopper 12 allowing powder 14 to fall from the bottom of the hopper.

Below gate 18 is a slanted passage 20. When powder 14 falls from hopper 12, it flows along passage 20. Slanted passage 20 slows powder 14 as it flows downward. The angle of passage 20 is selected to adjust the speed of the powder 14. The inner surface of passage 20 may be textured or include baffles or other features that mix or agitate the powder 14 to improve ignition. According to one embodiment, a set screw 20b is provided through the wall of passage 20. By adjusting the screw 20b into or out from passage 20, the speed of the powder 14 falling through the passage 20 can be adjusted.

At the lower end of passage 20 is ignition chamber block 22 with an internal cavity that forms an ignition chamber 23. According to one embodiment ignition chamber block 22 is formed from a refractory material that can withstand exposure to high temperatures when the powder 14 ignites. The material forming block 22 preferably has a high dielectric strength to facilitate a plasma arc between electrodes 24 and 26, as will be explained below. According to one embodiment, the material forming block 22 has a dielectric strength of about 10 kV/mm. Chamber block 22 may be formed from one or more of magnesium oxide, calcium sulfate, quartz, porcelain, glass, stone, other refractory material or combinations thereof. According to a preferred embodiment, chamber block 22 is formed from a calcium sulphate and magnesium oxide mix (CaSO4+MgO) as a solid mass. According to one embodiment, refractory materials, such as calcium sulphate and magnesium dioxide are mixed with reverse osmosis filtered water, molded into the shape of block 22, and dried to create the solid mass. According to a further embodiment, the refractory materials may be sintered. Ignition chamber 23 extends through block 22. Powder 14 exiting the end of passage 20 falls vertically through ignition chamber 23.

Figure 3:
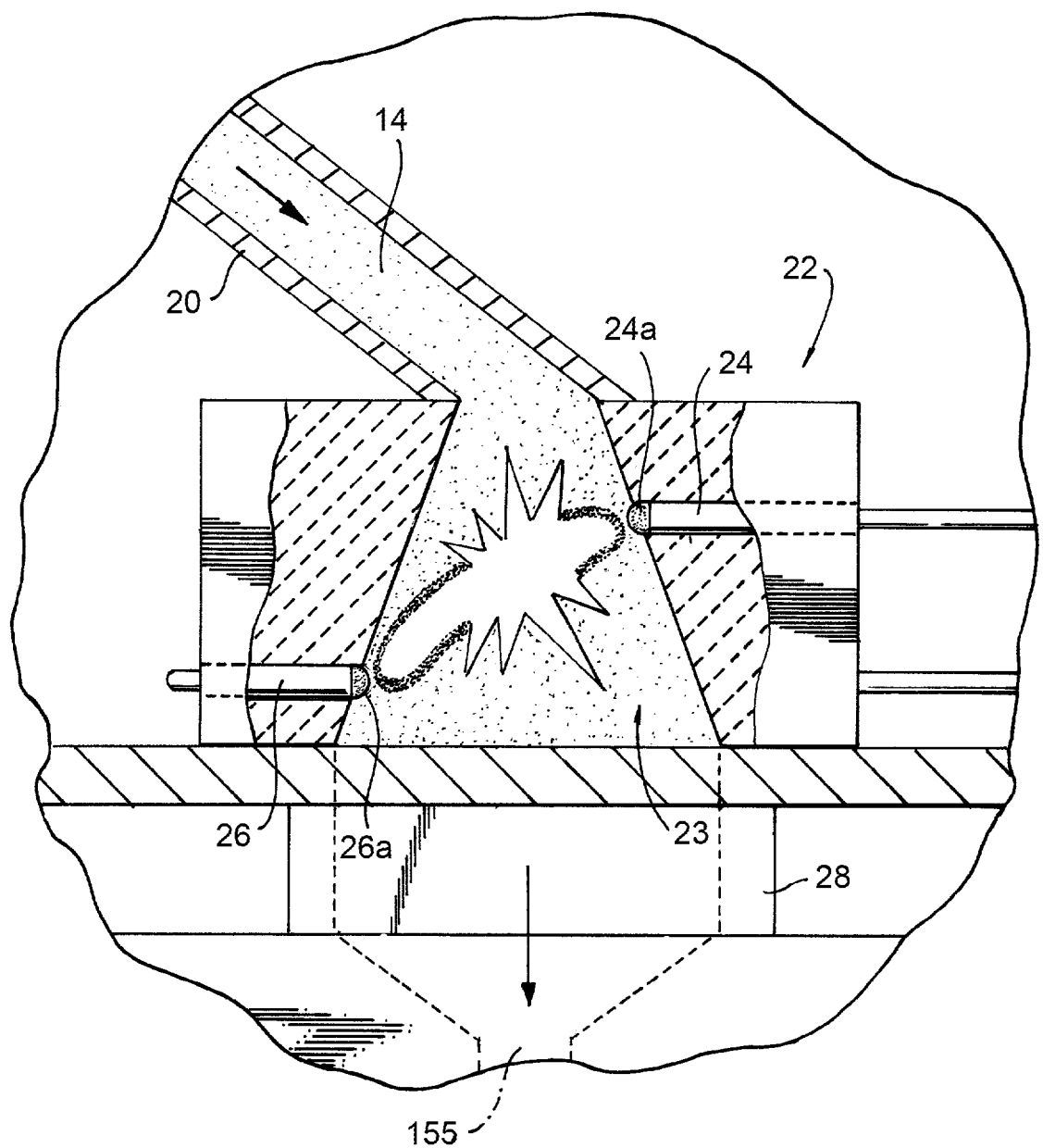
FIG. 3 shows the cross section of an ignition chamber used with the ignition system of FIG. 1.

FIG. 3 shows a cross section of the chamber block 22 that defines the ignition chamber 23. According to one embodiment, chamber 23 has vertical walls and is in the form of a right cylinder. According to a preferred embodiment, chamber 23 is in the form of a truncated cone with a smaller inlet at the top of the chamber 23 and a larger outlet at the bottom. This conic shape allows powder 14 that has been ignited (as will be described below) to expand as it increases in temperature and to fall freely through chamber 23.

Electrodes 24 and 26 extend through the sides of block 22 to chamber 23. Tips of electrodes 24a and 26a are located along the wall of chamber 23. According to one embodiment, tips 24a, 26a of the electrodes 24 and 26 are formed from a conductive, refractory material. According to a preferred embodiment, tips 24a, 26a are formed from graphite. Reaction products generated by ignition of powder 14, such as metallic copper, may have a lower tendency to stick to graphite than to other materials. According to other embodiments, instead of two electrodes 24, 26, a greater number of electrodes may be provided. The number and location of the electrodes in the wall of chamber 23 may be selected to modify the shape of the plasma created when the electrodes are energized.

As shown in FIGS. 2a and 2b, high voltage generator 30 is connected with electrodes 24 and 26. Generator 30 generates a high voltage between the tips 24a, 26a of the electrodes 24 and 26. As shown in FIG. 3, the voltage applied to the electrodes is sufficient to ionize air between the electrode tips 24a, 26a, creating a low resistance plasma between the electrodes and generating an electrical arc. The applied voltage is preferably greater than about 60 kV and more preferably greater than about 100 kV. According to some embodiment, the electric field between electrode tips 24a, 26a is between about 3000 and about 5000 volts per millimeter. The arc reaches a high temperature, in some cases in excess of 4000° F. Powder 14 falling through chamber 23 is subjected to the high temperature generated by the arc, initiating a chemical reaction between the components of the powder 14.

According to some embodiments, current is delivered to electrodes 24, 26 as a series of pulses. According to a preferred embodiment, generator 30 delivers pulses of current at a frequency of between about 25 kHz and 100 kHz for a duration of about 1 second to about 4 seconds, as will be explained more fully below.

Once it is ignited, the falling powder 14 reaches a high temperature. The ignited powder 14 falls through the chamber 23 and out from the bottom of the chamber 23. In one embodiment, a graphite shield 28 is provided at the outlet of chamber 23. Shield 28 protects the bottom surface of the ignition system 10 from the high temperature powder 14 and reduces accumulation of reaction produces, such as metallic copper, on the bottom surface of the system 10.

According to one embodiment, cleaning rod 40 is provided. Prior to initiating a weld, as shown in FIG. 2a, cleaning rod 40 extends through hole 18b in gate 18, through a hole 20a in the top of slanted passage 20, and into chamber 23. According to a further embodiment, cleaning rod 40 may be pressed downward against the force of a biasing spring 43. According to one embodiment, the system includes a mechanism, such as a spring pin (not shown) that engages rod 40 to hold it in the position shown in FIG. 2a. Releasing the spring pin allows system 10 to be configured to initiate an exothermic weld, as shown in FIG. 2b.

According to some embodiments, cleaning rod 40 is operable to dislodge material that may coagulate on the surface of chamber 23. The rod 40 is pressed downward to extend through chamber 23 and pass in close proximity to the inside surface of chamber 23 and the electrode tips 24a, 26a. Knurling may be provided at the lower end of rod 40 to facilitate the removal of coagulated material. This assures that the reaction chamber 23 is free of obstructions and that the electrode tips 24,26 are free of slag or other debris that might impair the generation of a plasma arc when the electrodes 24 and 26 are energized.

As shown in FIG. 2a, cleaning rod 40 engages with gate 18 via hole 18b to prevent gate 18 from opening while the cleaning rod is extended downward. This assures that powder 14 is not prematurely released from hopper 12, for example, while ignition system 10 is being transported to a job site. Cleaning rod 40 includes knob 42 that can be grasped by the user to withdraw the cleaning rod 40 and enable operation of gate 18, as shown in FIG. 2b.

According to one embodiment, knob 42 engages interlock switch 41, which may be a pushbutton. Interlock switch 41 prevents the ignition system from actuating until rod 40 is removed from chamber 23 and withdrawn from hole 18b. When rod 40 is lifted, as shown in FIG. 2b, switch 41 is released.

Exothermic mold 150 is positioned below ignition system 10. An opening 155 at the top of mold 150 is aligned with the opening at the bottom end of chamber 23. According to one embodiment, flanges 34 on the bottom surface of ignition system 10 engage with mold 150 to assure that opening 155 is aligned with chamber 23. According to other embodiments, no flanges are provided. Instead, system 10 is adapted to be positioned onto various sized and shaped molds. According to some embodiments, cleaning rod 40 extends through chamber 23 and out the bottom of the ignition system 10 prior to ignition. The end of cleaning rod 40 may be inserted into opening 155 to confirm alignment of the ignition system 10 and mold 150.

Figure 4:
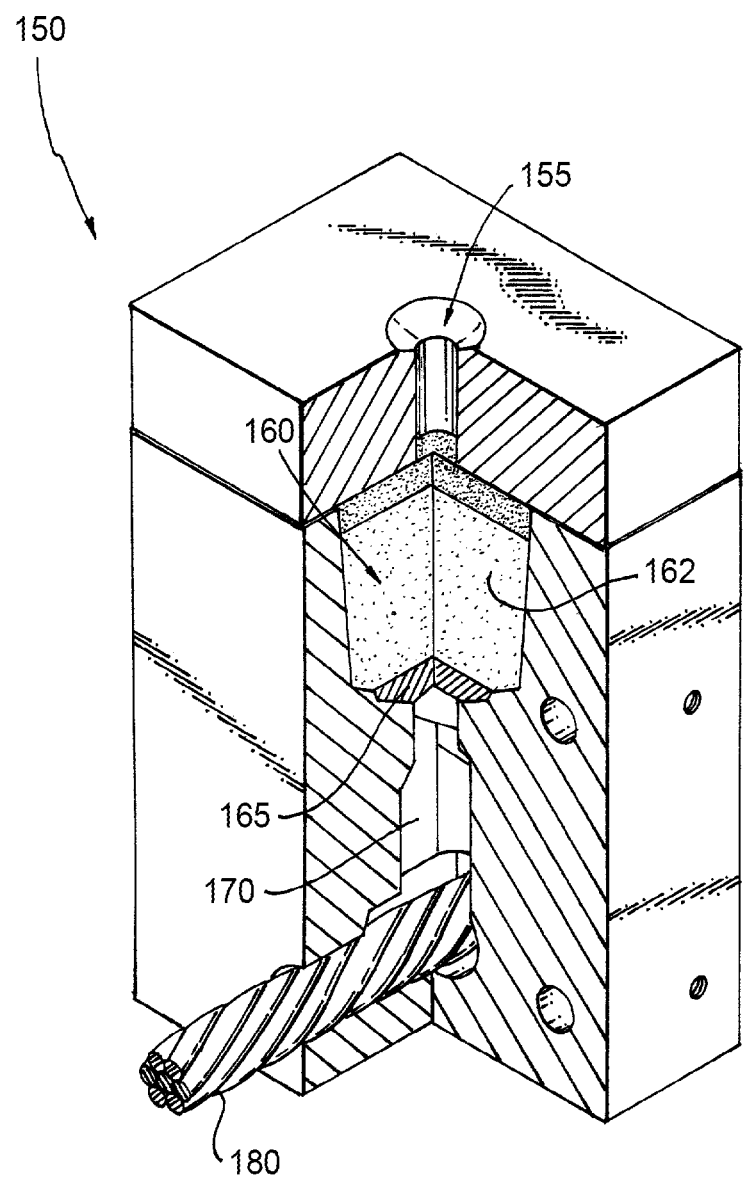
FIG. 4 shows an exothermic mold that can be used with the ignition system of FIG. 1.

FIG. 4 shows a partial cutaway view of the mold 150 for forming an exothermic weld. One or more conductors 180 or other objects to be welded together are positioned at a lower portion of the mold 150. Different configurations of the mold 150 are used to form different types of connections between conductors. For example, mold 150 may be shaped so that two or more intersecting conductors are welded together. For clarity, only a single conductor is show in FIG. 4. Surrounding the portion of conductors 180 being welded is a mold cavity 170. When cavity 170 fills with liquid metal, as will be explained below, the metal wets the conductors 180. Once the metal cools and solidifies, a secure mechanical and electrical connection is made with the conductors 180.

Reaction cavity 160 is located above mold cavity 170. Reaction cavity 160 is connected to the mold cavity 170 by a vertical passage. Metal disk 165 blocks this passage. Reaction cavity 160 holds a quantity of a welding mixture 162. Metal disk 165 at the bottom of cavity 160 prevents the welding mixture 162 in reaction cavity 160 from falling into the mold cavity 170. Welding mixture 162 may be the same as powder 14, discussed above. According to other embodiments, welding mixture 162 may have a different chemical composition from powder 14. According to still other embodiments, welding mixture 162 is the same chemical composition as powder 14 but has components with a smaller or larger particle size than powder 14.

Opening 155 is located at the top of mold 150 and extends into the reaction cavity 160. Powder 14 that has been ignited by the electrical arc in chamber 23 falls through opening 155 and lands on welding mixture 162. Ignited powder 14 is at a high temperature, for example, greater than about 3000° F., after being ignited in chamber 23. This burning powder 14 initiates a thermite reaction in the welding mixture 162.

The thermite reaction of the welding mixture 162 generates liquid metal, for example, copper, at a very high temperature. Disk 165 is made from a metal with a melting point less than the temperature at which mixture 162 reacts, for example, steel or iron. As a result, disk 165 melts, allowing the liquid metal in reaction cavity 160 to fall into mold cavity 170, forming a weld with conductors 180.

Figure 5:
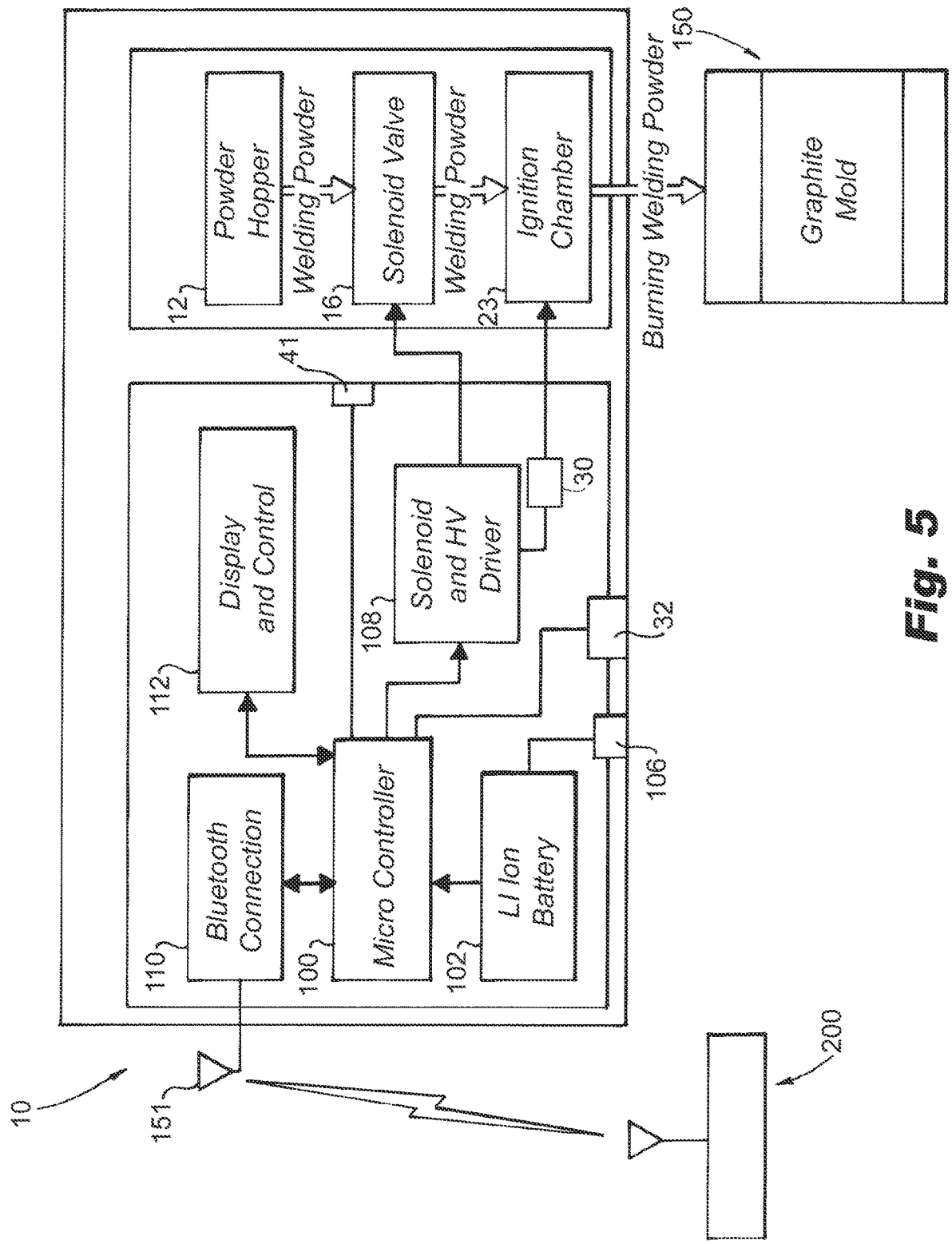
FIG. 5 is a block diagram showing the function of the mechanical and electrical components of the ignition system of FIG. 1.

FIG. 5 is a block diagram illustrating the function of electrical and mechanical components of the ignition system 10. Microcontroller board 100 is connected with a power source 102. According to one embodiment, power source 102 is a rechargeable battery, such as a lithium-ion battery. According to one embodiment, a charging port 108 provides a connection to a source of current to recharge the battery 102. According to other embodiments, battery 102 is removable from system 10 and is recharged using a separate recharging mechanism. According to still further embodiments, power source 102 is formed from one or more cell adapters, such as a "D"-cell adapter, designed to hold a number of commercially available disposable or rechargeable batteries in a housing that is removably connected with the ignition system 10.

According to still other embodiments, instead of providing a battery or other internal power source 102, electrical power is provided to ignition system 10 from a vehicle battery. A "cigarette lighter" adapter may be provided to connect the system 10 with the electrical system of a vehicle via port 108. According to still further embodiments, power is provided to system 10 by an electrical plug adapted to connect with an electrical generator or a municipal electric grid. Additional circuitry may be provided to convert the output of the grid to provide, for example, 12-volt DC power to the system 10.

Microcontroller board 100 is connected with a solenoid and HV driver board 106 that energizes solenoid valve 16 and provides a control signal to high voltage generator 30. Generator 30 may comprise a flyback transformer, rectifiers, and high voltage filter capacitors, as described below, to convert a low voltage, direct current signal from power source 102 to high voltage pulses to energize electrodes 24, 26. As discussed above, when solenoid 16 is energized as shown in FIG. 2b, gate 18 is moved horizontally, aligning hole 18a with the opening at the bottom of hopper 12 to allow powder 14 to fall through passage 20 and into chamber 23.

Driver board 106 controls high voltage generator 30 to provide a voltage between electrodes 24, 26 in chamber 23 to generate and maintain a plasma arc. Microcontroller board 100 includes circuitry to synchronize actuation of the solenoid valve 16 initiating the flow of powder 14 into ignition chamber 23 with the application of high voltage so that the plasma arc generated between the electrodes 24, 26 interacts with the falling powder 14 to ignite the powder.

According to one embodiment, solenoid 16 is energized to open gate 18 at the same time that generator 30 is energized to apply a high voltage between electrodes 24, 26. According to one embodiment, solenoid 16 is actuated to open gate 18 for a period of between about 200 milliseconds and 300 milliseconds. According to another embodiment gate 18 is actuated two, three or more times in succession to allow a selected quantity of powder 14 to fall through passage 20 and into chamber 23 while high voltage is supplied to maintain a plasma arc in chamber 23. According to other embodiments, a delay is provided between the actuation of solenoid 16 and the application of high voltage to the electrodes 24 and 26 to allow for the time for powder 14 to flow from hopper 12 to chamber 23. According to another embodiment, high voltage pulses are provided between electrodes 24, 26 for a period of about 1 second to about 6 seconds. During that period, gate 18 is periodically opened to allow a small quantity of power 14 to fall through chamber 23 as a plasma is maintained between the electrodes 24 and 26.

Microcontroller board 100 may be connected with interlock switch 41. According to one embodiment, switch 41 is a pushbutton switch. As described above, when cleaning rod 40 is in the configuration shown in FIG. 2a, switch 41 is pressed, signaling to the microcontroller 100 not to actuate an ignition. When rod 40 is withdrawn, as shown in FIG. 2b, switch 41 extends upward, closing or opening a contact within the switch and signaling to the controller 100 that the system 10 can be armed to initiate an ignition.

According to one embodiment, microcontroller board 100 is connected with a radio frequency communication device 110 such as a Bluetooth transceiver and antenna 151. A remote-control device 200 communicates with microcontroller 100 via the communication device 110. According to some embodiments, remote-control device 200 comprises a cellular telephone equipped with an application to generate signals to configure and activate ignition system 10.

Figure 6:
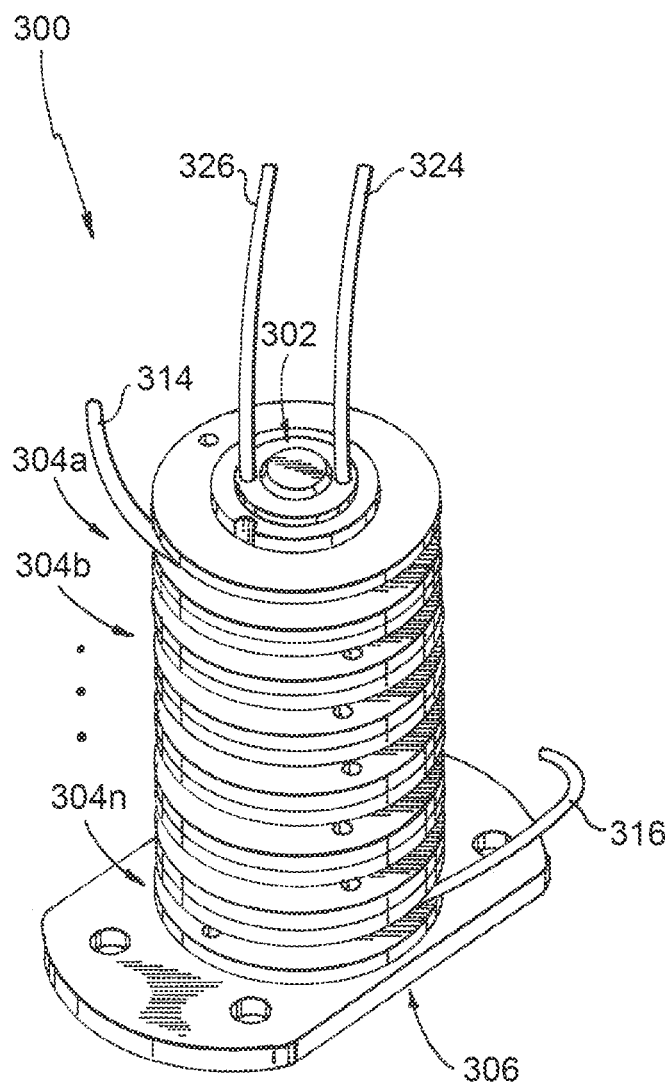
FIG. 6 is a perspective view of a transformer used with the ignition system of FIG. 1.

High voltage generator 30 includes a transformer 300, shown in FIG. 6, that converts a low voltage electrical current provided by power source 102 to high voltage current suitable for creating and maintaining a plasma arc. According to one embodiment, transformer 300 is a flyback transformer.

Figure 7A:
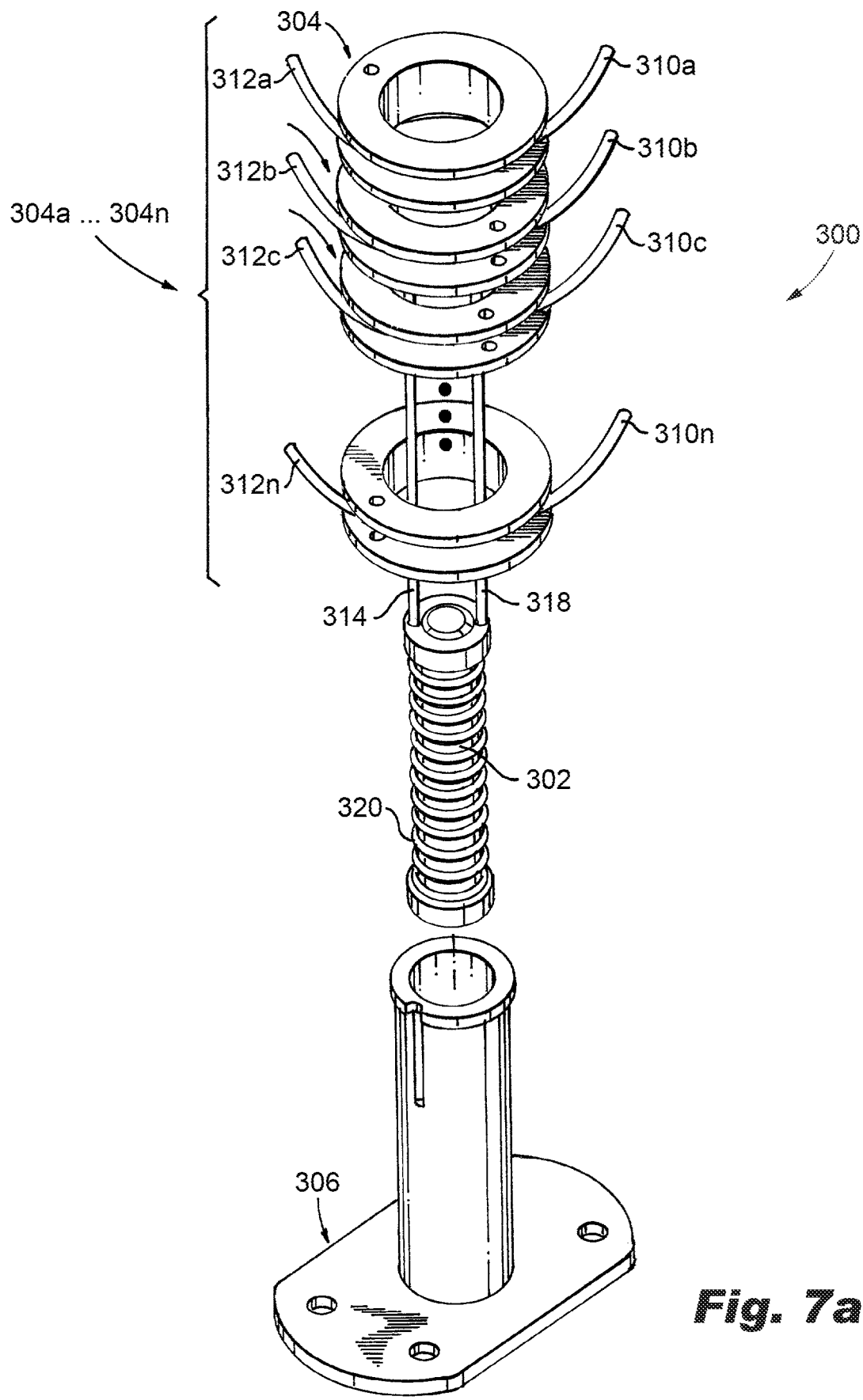
FIG. 7a is an exploded view of the transformer of FIG. 6.

FIG. 6 shows an embodiment of transformer 300. FIG. 7a shows an exploded view of transformer 300. Ferrite core 302 is provided along the axis of the transformer 300. Support 306 surrounds core 302. A primary winding 320, as will be explained below, is provided around core 302 within support 306. The secondary windings of transformer 300 are formed by a plurality of winding segments 304a, 304b, . . . 304n connected in series. These segments surround ferrite core 302 and primary winding 320. Output leads 324, 326 extending from secondary windings 311 on winding segments 304a, 304b, . . . 304n provide a high voltage output. According to one embodiment, output leads 324, 326 are connected with electrodes 24, 26. Input leads 314, 316 provide an input current to transformer 300. According to one embodiment, circuitry in high voltage generator 30 and/or on driver board 106 provide an input waveform via leads 314, 316 to generate high voltage output across leads 324, 326.

Figure 7B:
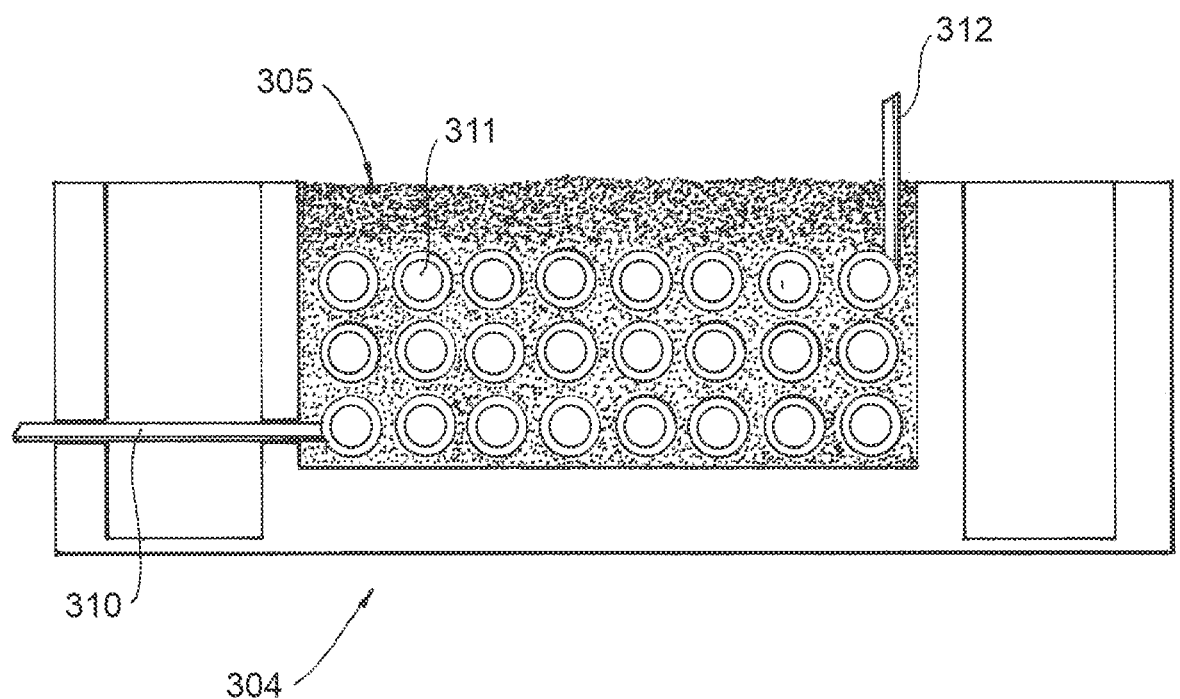
FIG. 7b is a detailed cross-section view of a portion of a winding of the transformer of FIG. 6.
Figure 7C:
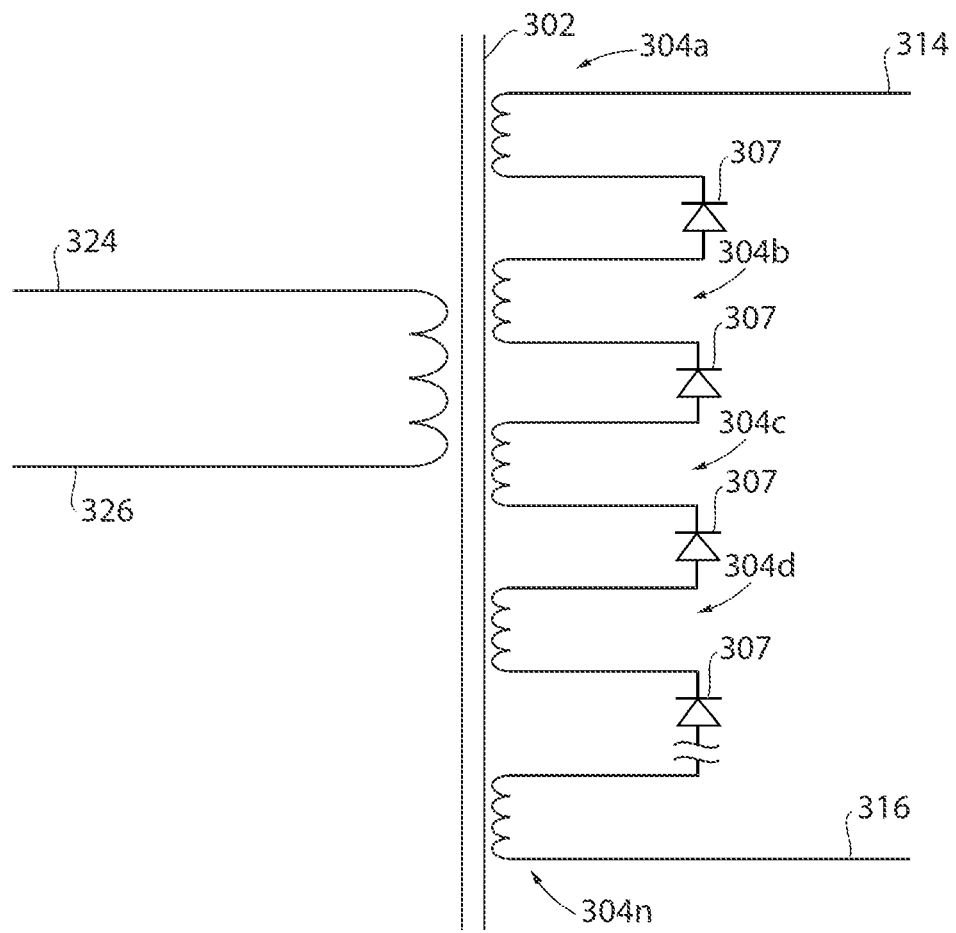
FIG. 7c is an electrical schematic of the transformer of FIG. 6.

FIGS. 7a, 7b, and 7c show the construction of transformer 300 according to embodiments of the disclosure. FIG. 7a shows an exploded view of transformer 300. Support 306 includes a hollow section sized to hold ferrite core 302 and primary winding 320. Secondary winding segments 304a, 304b, . . . 304n are supported on bobbins 304. Each bobbin 304 is wound with turns of wire. Leads 310a, 310b, . . . 310n and 312a, 312b, . . . 312n extend from each bobbin 304. Bobbins 304 holding secondary winding segments 304a, 304b, . . . 304n are stacked along support 306 and may be secured to one another and to the other components of transformer 300 by layers of tape and a potting compound, for example, epoxy.

FIG. 7b shows a cross-section of one side of bobbin 304. Wire windings 311 are arranged around bobbin 304. The wire includes insulation to prevent current from flowing between the wire windings 311. Windings 311 are embedded in a matrix 305 that keeps the wire fixed on the bobbin 304. The matrix may be an epoxy potting compound.

According to one embodiment, primary winding 320 and secondary windings 311 are copper wires covered in an enamel insulator. According to a preferred embodiment, the primary winding 320 is formed from dual coated Standard Wire Gauge (SWG) 36 sized copper wire and the secondary windings 311 comprising each of the segments 304a, 304b, . . . 304n are formed with SWG 38 sized wire. Multiple parallel windings may be provided. According to a preferred embodiment, six parallel windings are provided to form the primary winding 320. Multiple parallel windings allow an increase in current density in the primary winding 320.

The number of turns of the primary and secondary windings and/or the ratio of turns of the windings are selected to provide a sufficient voltage to electrodes 24, 26 to create and sustain an arc that will ignite powder 14 passing through chamber 23. According to one embodiment, the primary winding 320 is formed by seven turns of wire about core 302 and creates a coil with an inductance from about 2.2 microhenries (pH) to about 2.4 pH. According to another embodiment, the secondary winding is formed from eight segments 304a, 304b, . . . 304h wired in series, where each segment has 200 turns of wire, to create a coil with an inductance (without the ferrite core) of about 24 milihenries (mH). A greater or fewer number of turns may be provided for the primary and secondary windings according to embodiments of the disclosure, depending on the desired electrical characteristics of transformer 300.

According to one embodiment, secondary winding segments 304a, 304b, . . . 304n are connected in series, but the direction of the windings is alternated so that a first segment 304a is arranged with windings going clockwise (CW) around core 302, a second segment 304b is arranged with windings in the counterclockwise (CCW) direction, a third segment with windings in the CW direction and so on. Interconnection of leads 310a, 310b, . . . 310n and 312a, 312b, . . . 312n of respective winding segments 304a, 304b, . . . 304n are arranged so that current flows in the same direction about the ferrite core 302 in each segment. According to another embodiment, as shown in FIG. 7c, diodes 307 may be provide in series with the secondary winding segments 304a, 304b, . . . 304n. According to some embodiments, one or more high voltage filtering capacitors are provided across the output of transformer 300.

In operation, driver 106 generates a switched, direct-current signal, for example, a square wave, across inputs 314 and 316 of transformer 300 When voltage is applied to primary winding 320 by driver 106 (that is, at the rising edge of the square waveform), current begins to flow in a first direction, generating a magnetic field through core 302 and windings 320, 311 that results in an induced impedance opposing the flow of current. Diodes 307 prevent current from flowing in the secondary winding 304a, . . . 304n in the first direction, effectively reducing the impedance of the primary winding 320 while a magnetic field builds in the transformer 300. Energy stored by the magnetic field increases while voltage is applied across inputs 314, 316. When the waveform switches off (that is, at the falling edge of the square waveform) the magnetic field collapses, generating a high voltage across leads 324, 326 of the secondary winding 311 and in turn between the tips 24a, 26a of electrodes 24, 26 in chamber 23. This high voltage causes air between the electrode tips 24a, 26a to ionize, resulting in a low resistance path between the electrodes. Diodes 307 allow current to flow through secondary winding 311 and through the plasma arc. At the next rising edge of the waveform, the process beings again and another high voltage pulse is provided between electrodes 24, 26 at the falling edge of the waveform. According to one embodiment, driver 106 provides a square wave input to transformer 300. According to one embodiment the waveform applied to the primary windings 320 has a Vmax of about 12 volts to about 18 volts and a duty cycle of about 50%.

Microcontroller 100 is also connected with input/output devices, such as lights or a display screen 113 by display and control board 112 for communicating status information about the device and for receiving inputs, such as a ignition switch 112a, and a timer switch 112b. According to some embodiments, controller 100 includes a timer that begins a countdown once and activation button is pressed. At the end of the countdown, system 10 is activated to initiate the exothermic mold reaction. The delay provided by the countdown timer allows users to move to a safe distance before a reaction is initiated. The amount of time delay may be selected by actuating the timer switch 112b Microcontroller 100 is also connected with a tilt sensor 32. Tilt sensor 32 may be a solid-state accelerometer, a mercury switch, or the like. Tilt sensor 32 detects whether the ignition system 10 is in a level orientation so that powder 14 will reliably flow through passage 20 and through chamber 23.

According to some embodiments, an ignition system 10 according to the disclosure is operated as follows. A graphite exothermic mold 150 is prepared as shown in FIGS. 2a and 2b. Conductors 180 that will be welded are positioned in the mold cavity 170. Reaction cavity 160 is charged with a thermite reaction mixture 162.

Ignition system 10 is place on top of mold 150, as shown in FIG. 2a. Downward pressure is applied to knob 42 on the top of cleaning rod 40, pushing the end of the rod 40 through ignition chamber 23 and partially into opening 155 in the top of mold 150. This ensures that the opening at the bottom of ignition chamber 23 is aligned with opening 155 in the top of mold 150. Hopper 14 is checked to assure that there is sufficient reaction mixture 14 to initiate the exothermic weld process.

Main power switch 111 is then actuated to energize the electronic systems of ignition system 10. Display 113 shows that the current charge level of the batteries is sufficient to perform an ignition operation. Display 113 also shows a time delay value that provides the user with time to activate the system and move to a safe distance, as will be explained below. According to an embodiment of the disclosure, the time delay value may be 5 seconds, 10 seconds or 15 seconds. The time delay may be selected by repeatedly pressing the timer button 112b to scroll through the available set of delay values in a "round-robin" fashion to select a desired delay value.

Once the user has confirmed that ignition system 10 is ready and that mold 150 and conductors 180 are properly positioned, the ignition system 10 is actuated to create an exothermic weld. The user lifts rod 40 upward, disengaging it from hole 18a in gate 18 and releasing interlock switch 41.

According to one embodiment, the user has two options to create the weld. The user may either press the ignition button 112a or else actuate the system remotely using a remote device 200 via antenna 151 and communications device 110.

If the user chooses to initiate the weld using timer switch 112b, the user presses the switch and moves to a safe distance. This will start a countdown timer to start the ignition process after the expiration of the selected time delay. If the user chooses to use the remote device 200, the user moves to a safe distance and then activates device 200 to signal the start of the ignition process and start the countdown. Once the countdown is five seconds prior to ignition, a buzzer is sounded and lights on system 10 are flashed to alert the user.

Once the time delay has fully elapsed, controller 100 signals driver 106 to apply high voltage to electrodes 24, 26 by generator 30 to generate a plasma inside chamber 23 and to actuate the solenoid 16 to allow powder 14 to flow from hopper 12. According to one embodiment, powder 14 is allowed to flow from hopper 12 for about 200 milliseconds to 300 milliseconds before the solenoid is controlled to move gate 18 to close the hopper and stop the flow of powder 14. The high voltage is maintained for about one to six seconds so that the plasma continues to be generated as the powder flows through passage 20 and through chamber 23.

The falling powder is ignited and falls from chamber 23 into the reaction chamber 160 of mold 150 where it ignites reaction mixture 162. A thermite reaction is initiated in chamber 160, causing disc 165 to melt and generating molten copper that flows onto conductors 180 in mold chamber 170, completing the weld. The user then presses the power switch 111 to power off ignition system 10.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An igniter apparatus comprising:
   a powder container, the container adapted to hold an ignition powder;
   an ignition chamber positioned below the powder container and comprising an interior wall;
   a gate connecting the powder container and the ignition chamber, the gate adapted to open to allow powder to fall from the powder container into the ignition chamber; and
   a pair of electrodes mounted to the interior wall of the ignition chamber, wherein, when a voltage is applied to the electrodes an electrical arc is generated within the ignition chamber and wherein the arc ignites the powder.

2. The apparatus of claim 1, further comprising a controller, a solenoid connected with the gate controlled by the controller to open and close the gate, and a voltage generator connected with the electrodes and controlled by the controller, wherein the controller actuates the solenoid to open the gate in timed relation to application of the voltage to the electrodes from the generator, and wherein the arc is generated as powder falls into the chamber.

3. The apparatus of claim 1, wherein the ignition chamber comprises a bottom opening and wherein powder ignited by the arc within the chamber falls through the chamber and out the bottom opening.

4. The apparatus of claim 1, further comprising a sloped passage between the gate and the ignition chamber, wherein powder falling from the container flows along the sloped passage and into the ignition chamber.

5. The apparatus of claim 1, wherein the ignition chamber comprises one or more of a ceramic, a glass, a stone, and a metal.

6. The apparatus of claim 5, wherein the ceramic comprises calcium sulphate and magnesium oxide.

7. The apparatus of claim 1, wherein each electrode comprises a conductor and a graphite tip in electrical connection with the conductor and wherein the graphite tip faces the ignition chamber.

8. The apparatus of claim 1, further comprising a cleaning rod, wherein the cleaning rod is movable between an inserted configuration extending through the ignition chamber and a retracted configuration withdrawn from the ignition chamber, and wherein, when the cleaning rod is in the inserted configuration, the rod engages the gate to hold the gate closed to the passage of powder.

9. The apparatus of claim 1, further comprising a tilt sensor.

10. The apparatus of claim 2, wherein the high voltage generator comprises an induction coil, wherein the coil comprises a primary winding and a plurality of secondary winding segments.

11. The apparatus of claim 2, further comprising a radio frequency receiver connected with the controller, wherein the controller operates the gate and generator in response to a signal received by the receiver.

* * * * *